H. AUCHU.
MACHINE FOR MIXING EXPLOSIVES.
APPLICATION FILED OCT. 5, 1907.

902,464.

Patented Oct. 27, 1908.

3 SHEETS—SHEET 1.

H. AUCHU.
MACHINE FOR MIXING EXPLOSIVES.
APPLICATION FILED OCT. 5, 1907.

902,464.

Patented Oct. 27, 1908.

3 SHEETS—SHEET 2.

H. AUCHU.
MACHINE FOR MIXING EXPLOSIVES.
APPLICATION FILED OCT. 5, 1907.
902,464.
Patented Oct. 27, 1908.
3 SHEETS—SHEET 3.
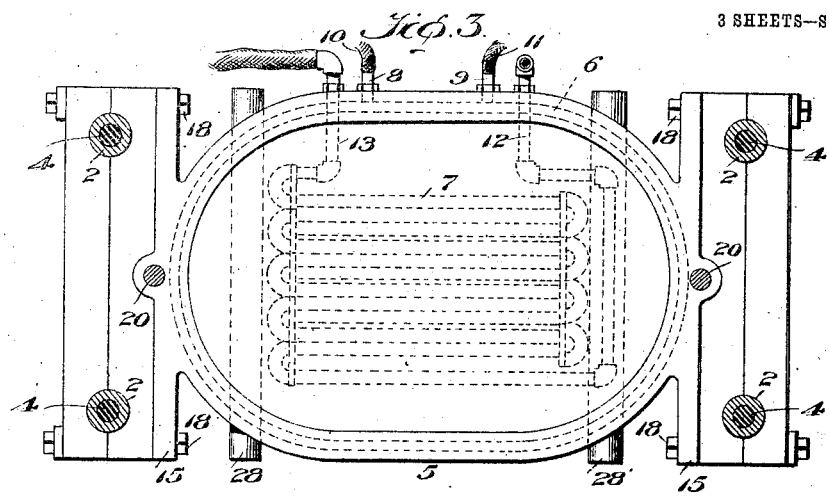
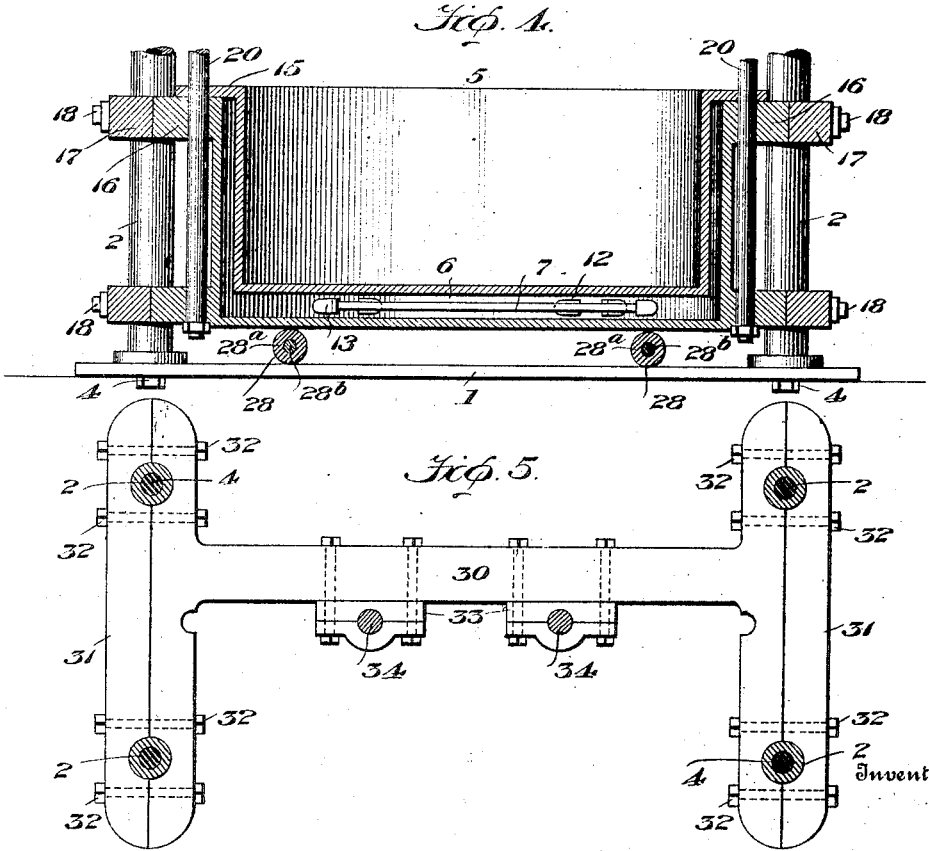

UNITED STATES PATENT OFFICE

HENRY AUCHU, OF EMPORIUM, PENNSYLVANIA.

MACHINE FOR MIXING EXPLOSIVES.

No. 902,464.  Specification of Letters Patent.  Patented Oct. 27, 1908.

Application filed October 5, 1907. Serial No. 396,108.

*To all whom it may concern:*

Be it known that I, HENRY AUCHU, a citizen of the United States, residing at Emporium, county of Cameron, and State of Pennsylvania, have invented certain new and useful Improvements in Machines for Mixing Explosives, of which the following is a specification.

My invention relates to machines for mixing explosives.

In an application for a machine for mixing explosives executed of even date herewith, Serial No. 396,109 I have set forth a machine wherein the mixing bowl or receptacle is adapted to be raised or lowered to cause to be positioned therein rotary mixing means which are stationary relative to the bowl. In that application motive fluid operated means is set forth for raising and lowering the mixing bowl or receptacle.

In some situations it is desirable to employ a strictly mechanical means for raising and lowering the mixing bowl of this mixing machine and the present invention has for its object the provision of novel means of this character whereby the attendant may raise and lower the mixing bowl by hand.

The invention contemplates the provision of novel means of the character set forth whereby a small amount of energy exerted by the attendant may be utilized to raise and lower the heavy mixing bowl or receptacle with ease and facility, which is accomplished by providing eccentrics, gearing, and a counter-weight all of which are fully set forth hereinafter and embodied in the appended claims.

Figure 1:
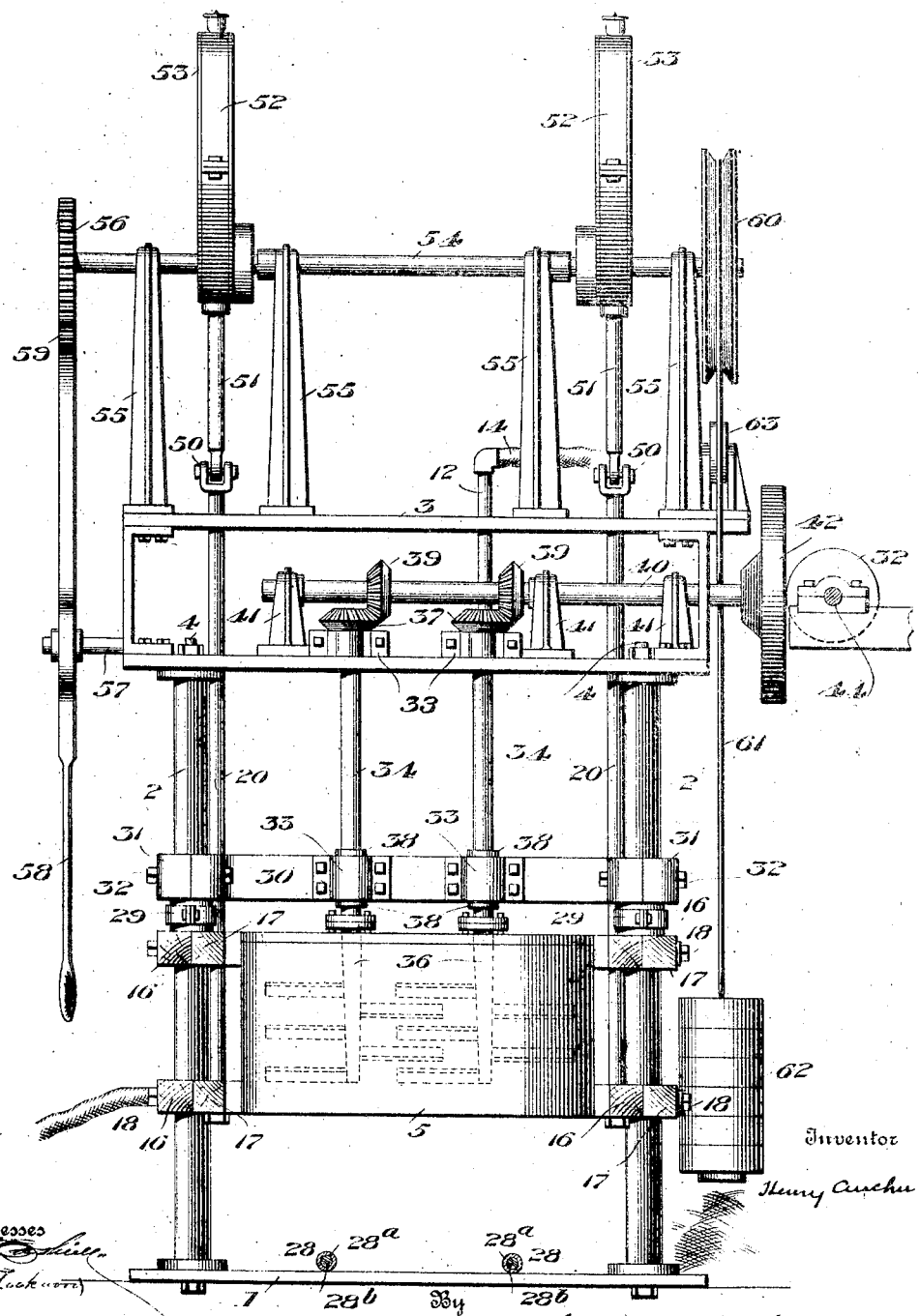
Figure 2:
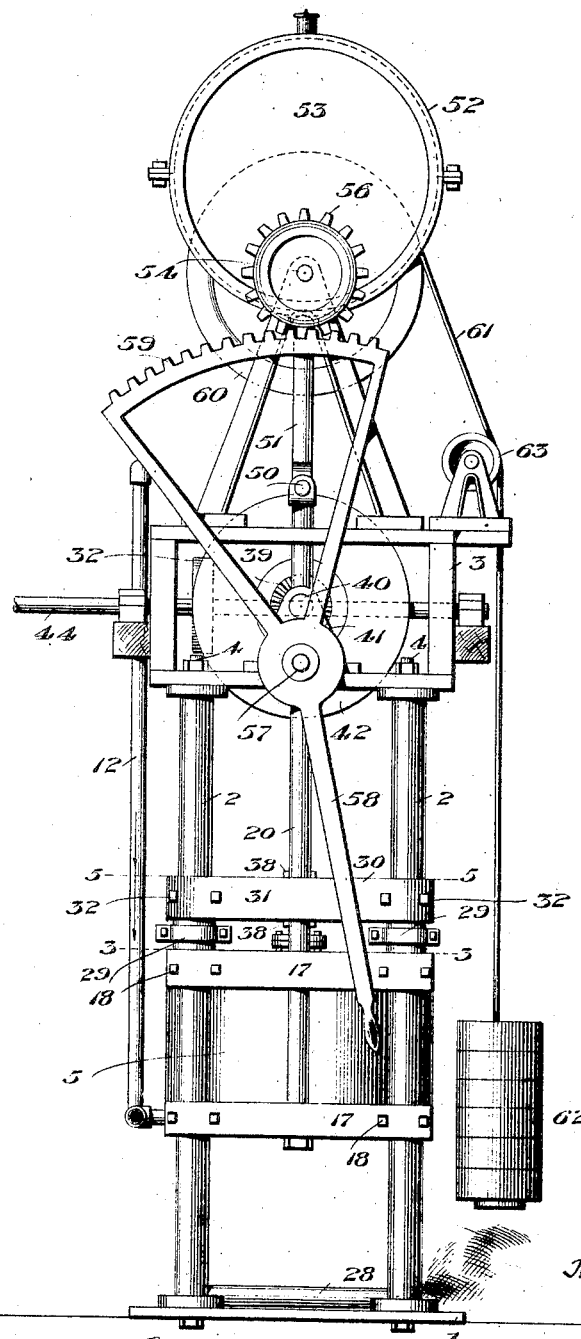

In the accompanying drawings:—Figure 1 is a front elevation; Fig. 2, a side elevation; Fig. 3, a detail section on line 3—3 of Fig. 2; Fig. 4, a vertical detail section of the mixing bowl and adjacent parts; and Fig. 5, a section on line 5—5 of Fig. 2.

The machine is supported by a metal base 1 which may have a suitable foundation and from which rise four hollow pillars 2 which sustain a frame-work 3, tie-rods 4 running through the piece 1, pillars 2 and framework 3 and rigidly tying the whole structure together.

The mixing bowl or tub 5 is of elliptical form, being provided with a water space 6 surrounding it and extending beneath it in a well known manner, while in the space under the mixing bowl there is located a steam coil 7 for heating the water whereby the contents of the bowl are kept at the proper temperature. The water space 6 has a water inlet 8 and an outlet 9 which are connected to flexible hose sections 10 and 11 respectively. Similarly, the coil 7 has the steam inlet 12 and an outlet or exhaust 13. The exhaust 13 may deliver the steam to any point. The inlet 12 extends upwardly and is connected to a flexible hose 14 receiving steam from any suitable source.

Secured to the laterally extending end-pieces 15 of the bowl 5 are wooden guides 16 and 17, bolts 18 being employed for this purpose. The guides 16 and 17 have semi-circular matching holes which receive the pillars or columns 2. Wood is used to prevent heating from friction as the guides slide up and down on the pillars 2. The bolts 18 provide means for adjusting the guides 16 and 17 with any desired degree of closeness of fit against the pillars 2.

Extending through openings in the end-pieces 15 are vertical rods 20, suitably secured to the said end-pieces, which pass upwardly through the frame 3. The rods 20 are coupled at 50 to links 51 of eccentric straps 52 which surround eccentrics 53 secured to the shaft 54 mounted in bearing standards 55 rising from the frame 3. The shaft 54 carries a pinion 56. Pivoted on the stub-shaft 57 projecting from frame 3, is a lever 58 whose lower end is provided with a handle in convenient position to be grasped by the attendant for swinging the lever laterally and on its upper end provided with a curved rack 59 meshing with the pinion 56.

To the shaft 54 is secured a sheave 60 to which is connected a cable 61 from which is suspended a counter-weight 62 of proper avoirdupois to balance the mixing bowl 5 and operating parts. The cable 61 passes over an idler sheave 63.

Extending cross-wise in relation to the bowl 5 and separated by the piece 1 are the bumpers or cushions 28 composed of rubber hose 28ᵃ having a central filling of wood 28ᵇ. I find that a cylindrical buffer or bumper presenting only a slight superficial area for the bowl to rest upon is much safer than a flat buffer for the reason that the explosive has no opportunity of being confined between the buffer and bowl and squeezed so that it will explode should it get in that position, the cylindrical surfaces of the buffers permitting it to drain off.

Secured on the pillars 2 are adjustable bumpers or buffers 29 which are positioned at the height to which it is desired the bowl 5 shall be raised.

Above the buffer 29 is a frame 30 supporting the mixer shafts, said frame being made in a single casting except the outer clamp pieces 31 which are secured to the frame by the bolts 32 whereby it is readily clamped to the pillars 2 and remains so at all times. Detachable journal boxes 33 are provided for the mixer shafts 34 which have collars 38 above and below the lower boxes 33 to prevent endwise movement of said shafts. The mixers 36 are detachably connected to the shafts 34 and are of a paddled or bladed construction, the blades having their faces inclined and those of one mixer interacting with those of the other mixer. However, different forms of mixers may be employed if desired. Key seated and rigidly connected by pins to the upper ends of the shaft 34 are beveled gears 37 supported on the upper journal boxes 33 and meshing with bevel gears 39 carried by a shaft 40 journaled in boxes 41 on frame 3. The shaft 40 carries a friction-wheel 42 driven by a corresponding wheel 32 loosely splined on a shaft 44 so that it may be slid to any position crosswise of wheel 42 to drive the latter faster or slower or reverse the rotation thereof so that the mixers after having been rotated a given time in one direction, may be reversed, a practice which is very beneficial in carrying out the mixing operation.

It being understood that the mixers and their shafts are incapable of up and down play and are not intended for such movement, the mixing operation will be carried on by raising the bowl 5 to cause submergence of the mixers in the liquid explosive in said bowl. In this position the bowl is at such a height that the attendant can readily observe the mixing operation and control the machine accordingly without inconvenience or having to stoop over as is now the case with mixing machines now known to the art. When the mixing operation is completed the bowl is lowered and the contents taken off. When so lowered access can be had to the mixers.

The raising and lowering of the mixing bowl is very easily effected on account of the great power obtained by the use of the eccentrics in connection with the lever and rack and pinion 56, 59, the hand-weight and eccentrics affording means whereby the mixing receptacle will remain in the position to which it is shifted by the operator.

The eccentric mechanism will prevent a great rise or descent of the mixing bowl and will hold it with great precision at the desired point at the upper or lower end of its run, every time it is operated so that no danger can arise from impact of the mixers against the bottom of the mixing bowl or violent deposit of the bowl on the buffers when it is lowered but will deposit the mixing bowl gently upon them, the eccentric mechanism sustaining the greatest portion of the weight of the bowl and its accessories.

Having thus described my invention, what I claim as new, and desire to secure by Letters Patent is:—

1. In a machine for mixing explosives, the combination with a mixing bowl, of mixing means adapted to operate in said mixing bowl, said bowl and mixing means being adapted for relative raising and lowering independently of their operation for mixing purposes, and means for accomplishing the relative raising and lowering of said bowl and mixing means independently of their operation for mixing purposes comprising an eccentric, an eccentric strap, and means for turning the eccentric.

2. In a machine for mixing explosives, the combination with a mixing bowl, and mixing means adapted for operation in said mixing bowl, of means for raising and lowering the mixing bowl comprising an eccentric, an eccentric strap operatively connected to said mixing bowl, and means for turning the eccentric.

3. In a machine for mixing explosives, the combination with a mixing bowl, of mixing means adapted to operate in said mixing bowl, said bowl and mixing means being adapted for relative raising and lowering independently of their operation for mixing purposes, means for accomplishing the relative raising and lowering of said bowl and mixing means independently of their operation for mixing purposes comprising an eccentric, an eccentric strap, means for turning the eccentric, and means for balancing the movable elements aforesaid.

4. In a machine for mixing explosives, the combination with a mixing bowl, and mixing means adapted for operation in said mixing bowl, of means for raising and lowering the mixing bowl comprising an eccentric, an eccentric strap operatively connected to said mixing bowl, means for turning the eccentric, and means for balancing the mixing bowl.

5. In a machine for mixing explosives, the combination with a mixing bowl, of mixing means adapted to operate in said mixing bowl, said bowl and mixing means being adapted for relative raising and lowering independently of their operation for mixing purposes, means for accomplishing the relative raising and lowering of said bowl and mixing means independently of their operation for mixing purposes comprising an eccentric, an eccentric strap, means for turning the eccentric, and means for balancing the movable elements comprising a wheel connected to the eccentric, and a counter-weighted cable adapted to wind on said wheel.

6. In a machine for mixing explosives, the combination with a mixing bowl, and mixing means adapted for operation in said mixing bowl, of means for raising and lowering the mixing bowl comprising an eccentric, an eccentric strap operatively connected to said mixing bowl, means for turning the eccentric comprising a pinion, a lever having a rack meshing with the pinion, a wheel connected to the eccentric, and a counter-weighted cable adapted to wind on the wheel.

In testimony whereof, I hereunto affix my signature in presence of two witnesses.

HENRY AUCHU.

Witnesses:
H. A. Cox,
Geo. P. Jones.